United States Patent [19]
Cook

[11] 4,289,338
[45] Sep. 15, 1981

[54] BELT TYPE EXPANSION JOINTS

[75] Inventor: Francis E. Cook, Downers Grove, Ill.

[73] Assignee: Dearborn Rubber Company, Westmont, Ill.

[21] Appl. No.: 165,967

[22] Filed: Jul. 7, 1980

Related U.S. Application Data

[62] Division of Ser. No. 922,561, Jul. 7, 1978, Pat. No. 4,250,223.

[51] Int. Cl.³ .................. F16L 27/10; F16L 51/02
[52] U.S. Cl. ......................... 285/229; 92/47; 138/120; 198/844; 198/847; 428/36; 428/285; 428/286; 428/287
[58] Field of Search ........... 74/231 R, 231 M, 231 P, 74/232; 92/47; 138/120; 156/137; 198/844, 846, 847; 285/226, 229; 428/36, 292–295, 285–287, 458, 483

[56] References Cited

U.S. PATENT DOCUMENTS

| | | | |
|---|---|---|---|
| 3,315,704 | 4/1967 | Shire | 428/450 X |
| 3,463,516 | 8/1969 | Munton | 285/227 |
| 3,647,247 | 3/1972 | Pintard et al. | 285/229 |
| 4,101,150 | 7/1978 | Thawley et al. | 285/226 |

Primary Examiner—Bruce H. Hess
Attorney, Agent, or Firm—Mason, Kolehmainen, Rathburn & Wyss

[57] ABSTRACT

An elastomeric expansion belt material includes an under layer having a heat resistant or insulating fabric, or matting, such as an asbestos fabric, carried by a polymerizable elastomer vulcanized to a heat shield including one or more layers of a metal foil, such as aluminum, and a polyester film, such as polyethylene terephthalate having the metal foil on the inner, or heat contacting surface. The heat shield substantially doubles the temperature resistance of the asbestos carried elastomer and substantially increases its resistance to chemically corrosive gases and particulate material.

10 Claims, 6 Drawing Figures

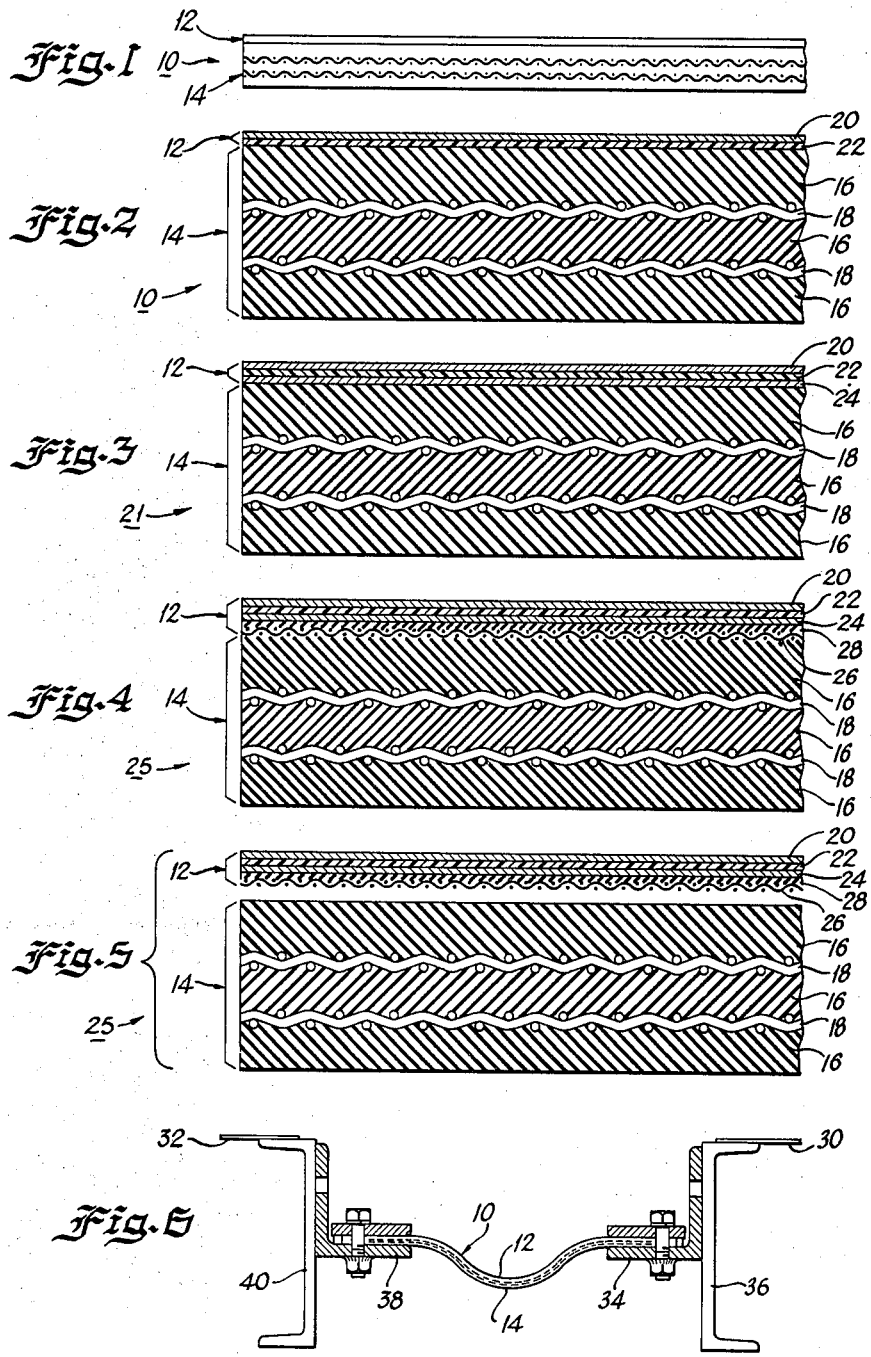

BELT TYPE EXPANSION JOINTS

This is a division of application Ser. No. 922,561 filed July 7, 1978, now U.S. Pat. No. 4,250,223.

FIELD OF THE INVENTION

The present invention relates to heat and chemical resistant belt-type expansion joints for use in ducting systems carrying hot gases and for use in conduits which are exposed to large variations in temperature. The heat resistant and chemical resistant belt material of the present invention provides flexible duct portions capable of providing for dimensional changes in the duct system to prevent excessive stresses. More particularly, the present invention relates to an elastomeric expansion belt material comprising an under layer including a heat resistant or insulating fabric, or matting, such as an asbestos fabric, carried by a polymerizable elastomer vulcanized to a heat shield comprising one or more layers of a metal foil, such as aluminum, and a polyester film, such as polyethylene terephthalate having the metal foil on the inner, or heat contacting, surface. The heat shield substantially doubles the temperature resistance of the asbestos carried elastomer and substantially increases its resistance to chemically corrosive gases and particulate material.

BACKGROUND OF THE INVENTION

Belt-type expansion joints are commonly used in industry today to provide relief from stresses caused by thermal expansion and contraction in large duct systems, and to reduce the transmission of vibration and noise. The belt-type expansion joints commonly used today are rubber flexible members including one or more layers of a heat resistant fabric, such as asbestos fabric, and have been found to be more effective than metal expansion joints because of their greater flexibility in a shorter space and their ability to withstand the acidic gases that are commonly present in ducting systems. The rubber expansion joints are commonly made from an elastomer, such as neoprene, chlorobutyl rubber, or VITON (a copolymer of hexafluoropropylene and vinilidene fluoride having a specific gravity of 1.82) having one or more layers of asbestos cloth sandwiched therein. The belt-type expansion joints are sometimes manufactured having a chemical resistant layer, such as polytetrafluoroethylene, as a loose overlay to provide both for thermal resistance and chemical resistance.

In accordance with the present invention, it has been found that the vulcanization of a heat shield including a polyester film, such as polyethylene terephthalate, and an inner, gas-contacting metal foil, such as aluminum, to a belt-type expansion joint comprising an elastomer carrying a heat resistant fabric, such as an asbestos fabric, provides an exceptionally efficient and desirable flexible belt material having unusually and unexpectedly good properties of protection against heat, and chemical attack, and excellent properties of strength and long life when subjected to repeated temperature changes.

PRIOR ART

The following prior art patents relate to expansion joints or flexible couplings:
Shire: U.S. Pat. No. 3,315,704;
Munton: U.S. Pat. No. 3,463,516;
Pintard et al: U.S. Pat. No. 3,647,247;
Breiner: U.S. Pat. No. 3,770,569;
Pintard: 3,811,714.

Further, Flow-Flex Engineering Co., a division of this assignee, has published a DESIGN GUIDE: FLOW FLEX BELT-TYPE EXPANSION JOINTS and a separate booklet: SUPPLEMENTAL DATA, which include a brief description of some of the most common expansion joint materials.

SUMMARY OF THE INVENTION

An object of the present invention is to provide a heat resistant and chemical resistant belt material that is particularly useful in expansion joints comprising a polymerizable rubber-carrying asbestos fabric vulcanized to a heat shield containing an outer, heat-contacting metal foil and a second layer of a polyester film, such as polyethylene terephthalate.

Another object of the present invention is to provide a flexible expansion joint material having substantially increased heat and chemical resistance including one or more layers of a heat resistant fabric carried by a rubber material, polymerizable to an elastomer, vulcanized and thereby bonded to a heat shield including one or more layers of a metal foil, a layer of a polyester film, and a heat resistant fabric, adhesively secured to a metal foil layer.

Another object of the present invention is to provide a method of manufacturing a heat resistant and chemical resistant belt material particularly useful as an expansion joint for use in ducts carrying hot gases, chemically corrosive gases, and abrasive particulate material, particularly where such ducts are exposed to substantial temperature gradients.

In accordance with an important object of the present invention, an elastomer material carrying a heat resistant fabric, such as an asbestos fabric, is vulcanized to a heat shield, containing in its broadest aspect one or more layers of a metal foil and a polyster film, such as polyethylene terephthalate, wherein the metal foil layer is an innermost, hot gas-contacting layer and the polyester film is provided as a second layer directly under the inner metal foil layer.

Another object of the present invention is to provide a method of manufacturing a heat and chemical resistant belt material wherein a polymerizable elastomeric rubber, including one or more layers of a heat resistant fabric, such as asbestos fabric, is vulcanized to a heat shield wherein the heat shield includes two layers of metal foil sandwiching an intermediate layer of a polyester film, and includes a layer of heat resistant woven fabric or matting, such as asbestos fabric, secured to the elastomeric rubber by bonding thereto via vulcanization.

In brief, the present invention relates to the surprising discovery that an elastomeric belt type material can have its temperature resistance substantially doubled by curing (vulcanizing) the elastomeric belt material i.e. with sulfur, while in contact with a heat shield to bond the elastomeric belt material to the heat shield. The heat shield includes one or more layers of a metal foil and a layer of a polyester film. It is important that the heat shield includes an outer layer of metal foil, such as aluminum foil, and a second layer of polyester film such as polyethylene teraphthalate. The aluminum foil and the polyester provide for both heat resistance and chemical resistance so that the resulting multi-layered belt material is useful as a duct material for the conveyance of hot and chemically corrosive gases and particulate material.

Surprisingly, it has been found that the heat shield must be cured (vulcanized) while in contact with the elastomeric belt material to provide exceptionally surprising results in heat resistance properties. It has been found that if the heat shield is merely clamped to the elastomeric belt material the resulting belt is much less thermally resistant than if the heat shield is vulcanized to the elastomeric belt material.

In the broadest aspect of the present invention, the composite belt material manufactured in accordance with the present invention includes an inner, heat-contacting surface of metal foil such as aluminum, stainless steel, or silver, and a film of chemically resistant polyamide material, such as polyethylene teraphthalate is directly under the hot gas-contacting inner metal foil layer. Surprisingly, it has been found that when a heat shield, including a metal foil and a polyester layer, is vulcanized to an elastomeric belt material containing a high-temperature-resistant woven or matting material, such as glass cloth, silica cloth, quartz matting, mineral wool matting, asbestos fabric, or mixtures thereof, the temperature resistance of the fabric containing elastomeric belt material is substantially doubled.

BRIEF DESCRIPTION OF THE DRAWING

FIG. 1 is a cut-away side view of a portion of a belt constructed in accordance with the principles of the present invention.

FIG. 2 is an enlarged cut-away side view of the belt shown in FIG. 1.

FIG. 3 is an enlarged cut-away view of a belt constructed in accordance with another embodiment of the present invention.

FIG. 4 is an enlarged cut-away side view of a belt constructed in accordance with another embodiment of the present invention.

FIG. 5 is an enlarged cut-away side view of the belt shown in FIG. 1 illustrating two separated belt portions prior to attachment by vulcanization.

FIG. 6 is a side view of the belt material disposed between adjacent duct portions to form an expansion joint.

DETAILED DESCRIPTION OF THE PREFERRED EMBODIMENT

Referring now to the drawing, and initially to FIG. 1, there is illustrated a composite belt material, manufactured in accordance with the present invention, indicated generally be reference numeral 10. The belt material 10 includes an outer heat shield 12 vulcanized to an elastomeric belt material indicated generally be reference numeral 14. The elastomeric belt material 14 includes a polymerized elastomer 16 carrying one or more layers 18 of a suitable high-temperature-resistant woven fabric or matting material, such as glass cloth, silica cloth, quartz matting, mineral wool matting, asbestos fabric, or mixtures thereof. The elastomer 16 can be rubber material capable of being polymerized, for example, in the presence of elemental sulfur, to cure and thereby provide flexibility to the rubber material. The total thickness of the elastomeric belt material 14 is about ⅛ to ¼ inch and, in a preferred embodiment, includes two layers 18 of woven asbestos fabric. When the elastomeric material is cured (vulcanized) it is secured to the outermost layer of the heat shield to provide surprising and synergistic heat resistance to the composite material. Such belt materials 14 are common and are disclosed in many of the prior art patents listed.

The heat shield 12 can have a variety of configurations, as shown with particularity in FIGS. 2-5. In each case, the heat shield must include an inner layer of a metal foil 20 for contacting a hot or chemically active material transported in a conduit, and a second layer of a polyester film 22. Any of the metal foils capable of reflecting heat are operative for use as the inner foil layer 20. Examples of suitable metal foils include aluminum, silver, stainless steel and the like. It has been found that a polyester film, such as polyethylene terephthalate is especially effective for use as the second layer 22 of heat shield 12 to achieve exceptionally surprising high temperature resistance and to prevent attack on the belt material from chemicals, such as sulfur, capable of deteriorating elastomers, when included in combination with the inner metal foil 20.

As shown in FIGS. 3 and 4, in accordance with another important embodiment of the present invention, a composite belt material 21 includes a second metal foil layer 24 disposed directly under the polyester film 22 to sandwich the polyester film 22 between metal foil layers 20 and 24. Any deterioration of inner foil layer 20 will not substantially adversely effect the heat resistance and long useful life of the composite belt material 10. The polyester film 22 can be heated while in contact with the one or both metal foil layers 20 and 22 to serve as a heat-stable thermosetting adhesive during manufacture of the heat shield 12. The thickness of the metal foil layers 20 and 24 and the polyester film 22 can vary over a wide range and these thicknesses are not critical to the practice of the present invention. Commonly, the metal foil layers 20 and 24 and the polyester film layer 22 are of a thickness in the range of about 0.005 to 0.04 inch.

In accordance with an important feature of the present invention, the composite belt manufactured in accordance with the present invention includes a layer of rubber or elastomer material containing one or more layers of a heat-resistant woven fabric or matting. Typical belt materials used for expansion joints today include a plurality of layers of woven asbestos fabric separated by layers of elastomer similar to the belt material 14 shown in the drawings. To achieve the full advantage of the present invention it has been found that the heat resistance of a composite belt material 25 can be substantially increased by securing a layer of heat resistant fabric or matting 26 to the outer surface of heat shield 12, as shown in FIGS. 4 and 5, with an intermediate film of a suitable, heat-stable adhesive 28. The adhesive layer 28 is unnecessary when the heat-resistant fabric or matting layer 26 is secured directly to a thermoplastic polyester second layer, such as to the layer 22 of FIG. 2.

The adhesive layer 28 used to secure the heat resistant fabric or matting 26 to the outer surface of heat shield 12 can be any suitable heat-stable adhesive. A heat resistant aluminized faric, made for the purpose of heat resistant clothing, having the fiber plys of the heat shield 12 of FIGS. 4 and 5 is manufactured by Gen Tex Corporation, Carbondale, Pa. and is called "Dual Mirror". In accordance with an important feature of the present invention, the adhesive layer 28 is an elastomer capable of securing the heat resistant fabric or matting layer 26 to the heat shield 12 by curing (vulcanizing) the elastomeric adhesive layer 28 while in contact with, and sandwiched between, the heat resistant fabric or matting layer 26 and intermediate layer 24 of heat shield 12.

As shown in FIG. 5, the heat shield 12 and the elastomeric belt material 14 can be manufactured initially separately as independent, integral members and then polymerized together in the presence of a curing or vulcanizing agent, such as elemental sulfur. The vulcanization of elastomers is well known in the rubber industry and, in accordance with the present invention, vulcanization of the belt material elastomers can be accomplished by heating the elastomer containing one or more common vulcanization agents, such as elemental sulfur; oxidizing agents such as selenium, tellurium, organic peroxides, and nitro compounds; and generators of free radicals such as organic peroxides, azo compounds and certain organic sulfur compounds such as the alkyl thiuram sulfides: thiazoles, thiazoline; dithiocarbamates; and mercaptoimidazolines. Vulcanization also can be accomplished by irradiation (gamma radiation). The temperature of vulcanization is well known in the art for each particular elastomer and there is nothing critical about the vulcanization temperature for manufacturing the belt type material of the present invention.

In accordance with another embodiment of the present invention, the separate layers of the heat shield 12 and the belt material 14 can be secured together at the same time as vulcanizing the belt material 14 to the heat shield 12. In this manner, the various layers of the composite belt material of any of FIGS. 2-4 can be stacked and bonded during vulcanization.

Turning now to FIG. 6, the belt material 10 is illustrated in position spanning two adjacent duct portions 30 and 32 to form a flexible expansion joint therebetween. The belt material 10 is secured to one duct portion 30 by attachment to angle iron or flange members 34 and 36. Similarly, an opposite end of the belt material 10 is secured to the adjustment duct portion 32 by attachment to angle iron or flange members 38 and 40. The flexible belt material 10 thereby accomodates for misalignment, expansion and contraction of adjacent duct portions 30 and 32.

Although the present invention is described in terms of particular constituents, and ranges thereof, and manner of making and using the same, it is recognized that departures may be made therefrom within the scope of the invention as defined in the appended claims.

I claim:

1. Apparatus for conducting hot or chemically active material comprising:
   a pair of adjacent ducts having a space therebetween;
   a duct connector secured to said adjacent ducts and disposed across said space between said adjacent ducts, said connector comprising a heat shield comprising a layer of metal foil secured to a layer of polyester disposed directly under said metal foil layer, said heat shield being secured to a layer of heat-stable elastomer having a heat insulating fabric embedded therein and said heat shield being vulcanized to said elastomer layer while said elastomer is in contact with said heat shield.

2. Apparatus as defined in claim 1 wherein said connector further includes a second metal foil layer disposed directly under said polyester layer to sandwich said polyester between said two layers of metal foil.

3. Apparatus as defined in claim 1 wherein said metal foil of said connector comprises aluminum foil and wherein said polyester of said connector comprises polyethylene terephthalate.

4. Apparatus as defined in claim 1 wherein said elastomer of said connector is selected from the group consisting of neporene, chlorobutyl rubber, and a copolymer of hexafluoropropylene and vinylidene fluoride.

5. Apparatus for conducting hot or chemically active material comprising a pair of adjacent duct portions having an expansion belt connected to said duct portions, said expansion belt comprising a first layer of a metal foil, a second layer of a polyester, a third layer of a metal foil, and a fourth layer of an elastomer vulcanized to said third metal foil layer, said elastomer including a layer of heat-insulating fabric or matting embedded therein.

6. Apparatus as defined in claim 5 wherein said polyester layer of said expansion belt comprises a polyethylene terephthalate film coextensive with said third foil layer.

7. Apparatus as defined in claim 5 wherein said first layer of metal foil of said expansion belt comprises an aluminum foil.

8. Apparatus for conducting hot or chemically active material comprising a pair of adjacent support members, said support members connected by a belt material, said belt material comprising an interior, gas-contacting first layer of a metal foil, a second layer of a polyester, and a third layer of material comprising an elastomer having a heat-insulating fabric or matting embedded therein, said third layer of material being secured to said polyester layer by vulcanization.

9. Apparatus as defined in claim 8 wherein the heat-insulating material of said belt is an asbestos fabric.

10. Apparatus as defined in claim 8 wherein said belt further includes a second metal foil layer disposed directly under said polyester layer to sandwich said polyester between said two layers of metal foil and further including a layer of heat stable adhesive to secure said heat-resistant fabric or matting to said second metal foil layer.

* * * * *